INVENTORS A.D. HALL
R. ZAROUNI, DECEASED
ALFRED ZAROUNI,
HIS ADMINISTRATOR
BY W. L. Keefauver
ATTORNEY

TANDEM ECHO SUPPRESSOR CIRCUITS

Filed Feb. 4, 1958

3 Sheets-Sheet 2

INVENTORS A.D.HALL
R.ZAROUNI, DECEASED
ALFRED ZAROUNI,
HIS ADMINISTRATOR
BY W. L. Keefauver
ATTORNEY INVENTORS: A. D. HALL
R. ZAROUNI, DECEASED
ALFRED ZAROUNI,
HIS ADMINISTRATOR
BY W. L. Keefauver
ATTORNEY 2,990,457

TANDEM ECHO SUPPRESSOR CIRCUITS

Arthur D. Hall, Summit, N.J., and Raymond Zarouni, deceased, late of Brooklyn, N.Y., by Alfred Zarouni, administrator, Brooklyn, N.Y., assignors to Bell Telephone Laboratories, Incorporated, New York, N.Y., a corporation of New York Filed Feb. 4, 1958, Ser. No. 713,226
6 Claims. (Cl. 179—170.2)

This invention relates to communication transmission circuits and more particularly to specific arrangements for reducing clipping, breaking, and lockout difficulties in built up telephone connections which include echo suppressors.

In a telephone circuit some of the electrical energy going from talker to listener is reflected back to the talker at points of electrical discontinuity, usually the listener's end of the circuit. If the elapsed time for this echo to return to the talker is very short, it is somewhat like receiver sidetone and, unless it is very loud, goes unnoticed. If the elaspsed time is longer, the echo becomes annoying to the talker and in extreme cases may actually prevent him from continuing to speak.

It is known that the disturbing echo phenomenon present in long connections may be materially reduced or eliminated through the use of an echo suppressor, a voice operated electronic device which inserts a large loss in the echo path at such a time that return echo currents are intercepted. However, when two or more telephone communication links are switched together to form a built up telephone connection which includes more than one echo suppressor, problems of breaking and clipping are introduced. In addition, whenever two or more echo suppressors are connected in tandem, the possibility of lockout arises. Lockout may occur in spite of differential echo suppressor operation, inasmuch as it is possible for each customer to operate one or more echo suppressors in the overall connection so that the conversation of neither customer is transmitted.

The problems created by the tandem arrangement of circuits including echo suppressors occur in a number of long distance connections. The complexity of these problems, however, has been considerably increased in connections which include international submarine cable systems since a given international route may include one or more suppressors in each included national circuit.

Heretofore, the only solution to the problem of clipping, breaking, and lockout brought about by the tandem connection of links containing echo suppressors has been to provide various arrangements to insure that every long built up connection includes at least one but not more than two echo suppressors. For example, switching arrangements are known whereby the excess echo suppressors existing in built up connections are automatically disabled. See, for example, United States Patent No. 1,545,558 to H. S. Hamilton and S. B. Wright, issued July 14, 1925.

In addition to limiting the number of echo suppressors in tandem on a given connection, a partial solution to the problems created has been effected by requiring the suppressors to be inserted, where practicable, near the electrical middle of the complete connection. However, this solution is necessarily restricted to a limited number of built up circuit situations. As a practical matter, it is usually not possible to locate suppressors at or near the electrical middle of a complete built up connection.

In a single link telephone circuit containing a single echo suppressor, hangover time may be fixed and still perform its designed function properly. In a multilink built up system, however, the proper time delay to be employed in echo suppressor operation necessarily depends on the total propagation time as established by the circuit parameters of each individual link. In built up circuits exceptionally long echo paths may result. In such cases, the echo suppressor selected for operation is unable to compensate for the radical difference between the length and the net loss of the new echo path and the length and the net loss of the single circuit echo path for which it was designed. Consequently, the quality of the service afforded by such a circuit may be considerably below the desired level.

It is therefore an object of this invention to improve the quality of built up communication systems.

It is a more specific object of this invention to reduce clipping, breaking, and lockout difficulties in telephone connections.

It is another object of the invention to reduce clipping, breaking, and lockout conditions while still maintaining effective anti-echo performance.

A further object of this invention is to afford improved protection against echoes by the use of echo suppressors, irrespective of the transmission time and the net loss of the circuits in use.

These and other objects of this invention are realized in one specific embodiment wherein the echo suppressor on one link of a built up telephone connection is automatically disabled and the release time of another suppressor in another link is automatically adjusted to the proper value whenever the links are switched together.

In accordance with one aspect of the invention, each one of a number of telephone communication links, each of which may or may not include an echo suppressor, has a distinctive marker arrangement. The marker serves to identify the particular circuit to any other circuit with which it might be placed in tandem connection. Upon connection of a first circuit, which includes a marker arrangement, with a second circuit, which includes an echo suppressor, a distinctive mark or signal is transmitted from the first circuit to the second circuit. In effect, the identifying signal serves to indicate to the second circuit that it is connected to a circuit with a particular combination of transmission time and net loss. The second circuit includes a number of resistance capacitance combinations with time constants suitably related to the transmission time and the net loss of each built up circuit likely to be formed. An arrangement of relays or other suitable switching devices actuated by the marker signal may then be employed to select the proper timing circuit. In turn, the output of the timing circuit actuates additional relays or other suitable switching devices in the echo suppressor which results in the introduction of hangover or delay time of the proper value for the particular circuit combination in use.

Another aspect of the invention includes an arrangement in combination with the automatic selection of hangover time whereby any excess echo suppressor or suppressors are automatically disabled. Further protection is thereby afforded against clipping and lockout difficulties. This aspect of my invention may advantageously employ a ground current or any suitable signal originating in the link which includes the timing circuits. If the other link or links of the built up connection include an echo suppressor, it may be automatically disabled by completing a circuit for the actuating signal through the crosspoints of the switching network to a switch, for example a relay, which is thereupon operated to effect the disabling of the echo suppressor.

It is, therefore, one feature of this invention that the release time of an echo suppressor in a built up telephone system be set automatically to a value determined by the transmission time and the net loss in the system.

It is an additional feature of this invention that a telephone communication link including an echo suppressor also include means for adjusting the suppressor to any one of a plurality of release times with such adjusting means being responsive to tandem connection with any one of an equal plurality of telephone links.

It is a further feature of this invention that whenever two links of a telephone system are switched together, with each link including an echo suppressor, the echo suppressor on one link will be automatically disabled and the release time of the echo suppressor on the second link automatically adjusted to a value proportional to the total transmission time and net loss in the circuit.

It is a still further feature of this invention that a telephone communication link including an echo suppressor also includes means for disabling the echo suppressor which means are responsive to the tandem connection of any one of a plurality of additional links, and which further includes means for initiating the selection of a delay time in the echo suppressor of the additional link.

A complete understanding of this invention together with additional objects and features thereof will be gained from consideration of the following detailed description and accompanying drawing in which.

Figure 1:
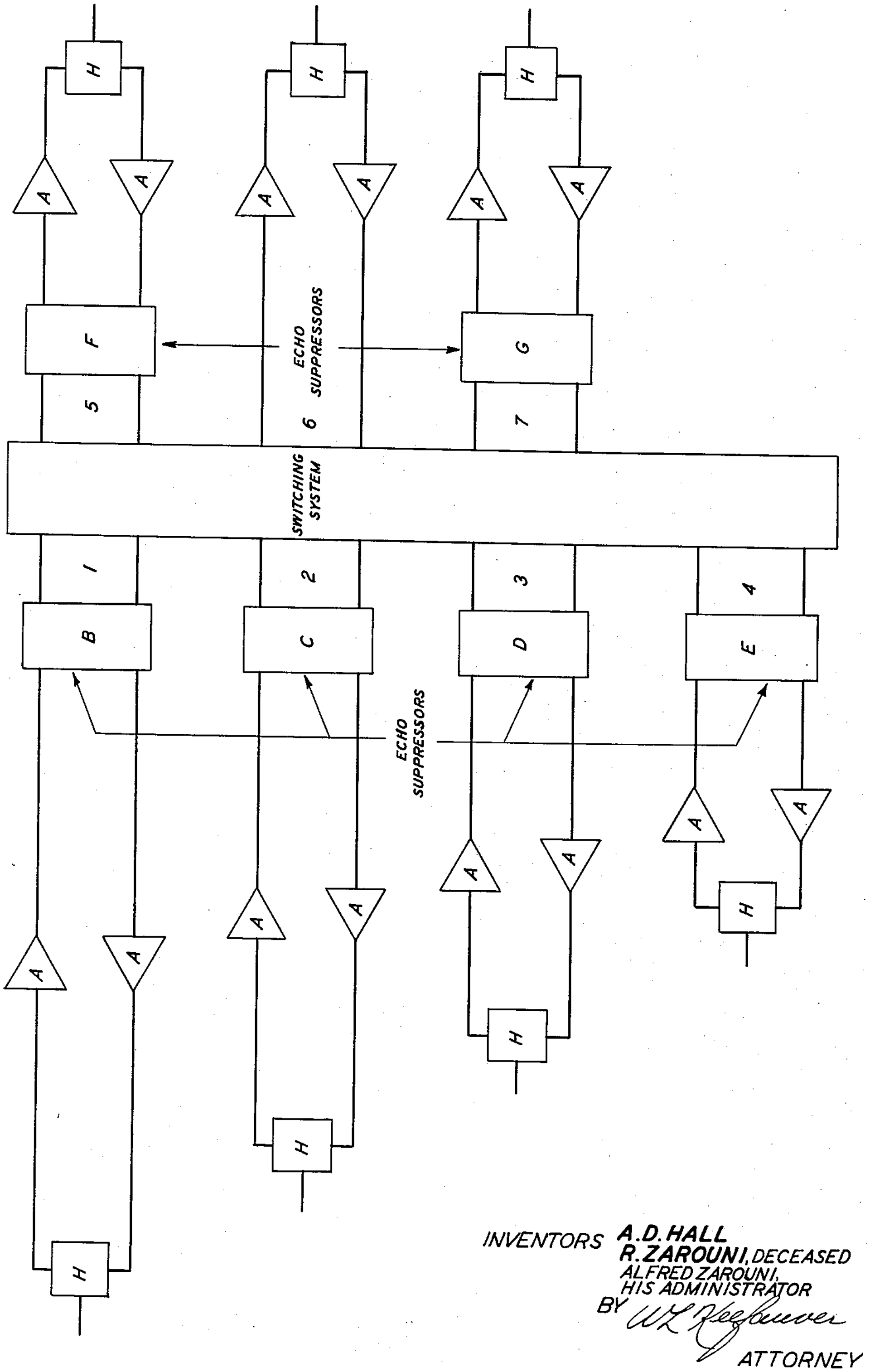
FIG. 1 shows, schematically, a communication system involving the tandem connection of communication circuits including echo suppressors with a plurality of possible tandem connections.

In FIG. 1 the individual circuits 1 through 7 are so arranged that any of the circuits 1 through 4 may be connected in tandem with any of circuits 5 through 7 by means of the connecting switching system. The hybrid coils H of each circuit, the amplifiers A, and the echo suppressors B, C, D, E, F, and G are, in each case, shown as single schematic units.

It will be noted that each of the circuits 1 through 4 is shown having a different circuit length, thereby implying a different signal transmission time and a different net loss in each case. Thus it is apparent that although a number of rather obvious expedients could be employed to introduce a delay or hangover time into echo suppressor F of circuit 5 that would be of suitable value and whose introduction would be responsive to the tandem connection of circuits 1 and 5, a different delay time would necessarily have to be introduced with the tandem connection of circuit 5 to circuits 2, 3, or 4. An additional problem would be raised by the tandem connection of circuit 5 or 7 to any of the circuits 1 through 4 inasmuch as two echo suppressors would be included in the built up connection. The specific purpose of FIG. 1, therefore, is to illustrate the general type of multiple circuit connection wherein the features of this invention may be employed with particular effectiveness.

Figure 3:
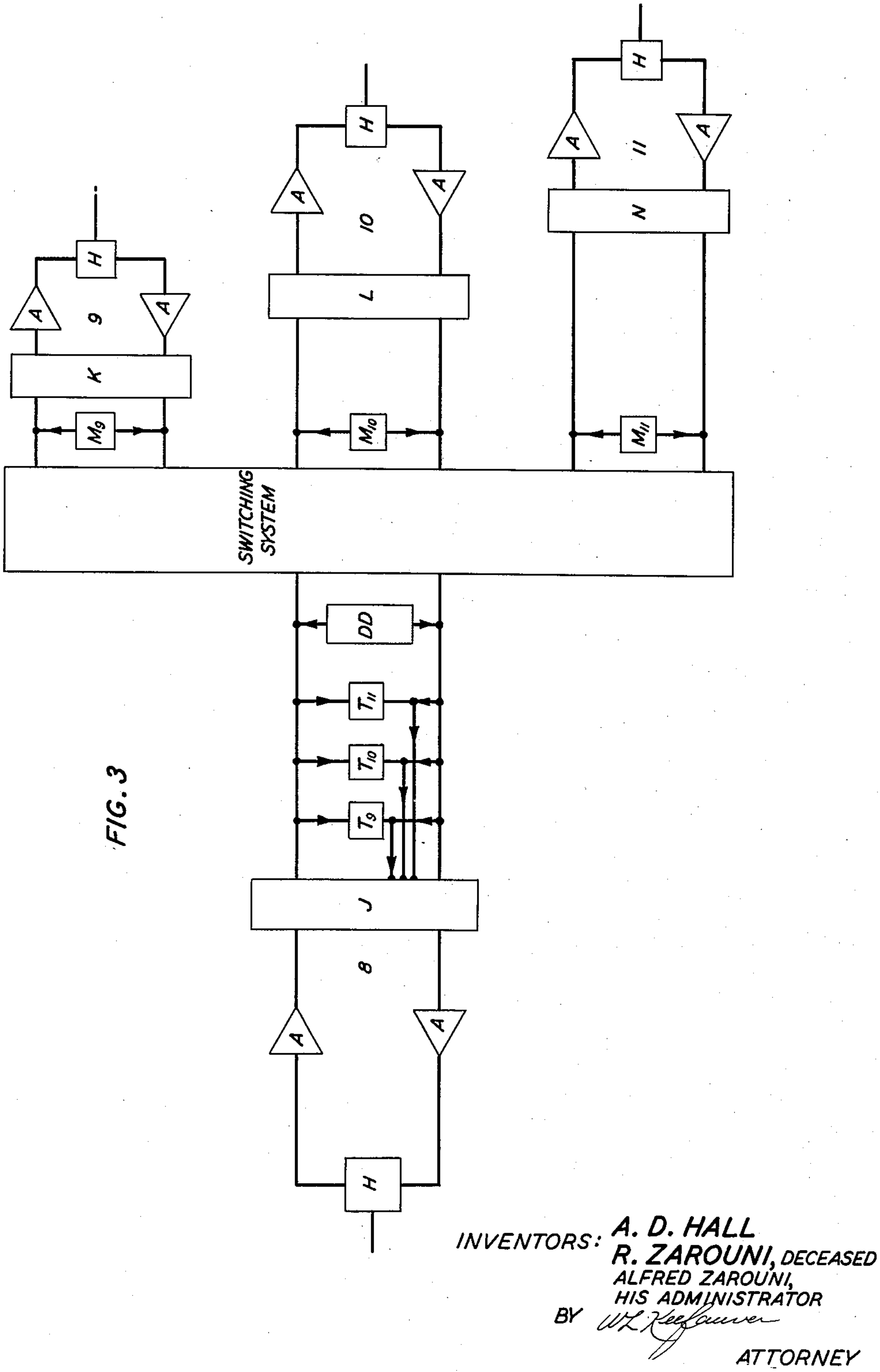
FIG. 3 is a block diagram of a particular embodiment of the invention in which one circuit may be tandem-connected to any one of three circuits.

FIG. 3 is similar to FIG. 1 in that it shows a communication system comprising a plurality of circuits with switching means for connecting selected circuit pairs in tandem. Additionally, however, FIG. 3 particularly illustrates the various features of the invention and the cooperative relationship among these features. The circuit 8 on the left of the switching system conventionally includes a hybrid H, amplifiers A and an echo suppressor J. Further, and in accordance with the invention, circuit 8 includes timing circuits $T_9$, $T_{10}$, and $T_{11}$. Each of these timing circuits is jointly responsive to the switching system and to an operating signal from a respective one of the circuits 9, 10 or 11 with which circuit 8 may be connected in tandem. The operation of any timing circuit serves to introduce a release time into the operation of echo suppressor J that is suitably related to the circuit characteristics of the particular tandem connection. Additionally, in accordance with the invention, an echo suppressor disabling device DD is shown connected across the circuit 8. In response to a switching system connection, the disabling device DD generates an output signal which serves to disable any echo suppressor in another circuit to which it is tandem-connected.

On the right of the switching system three additional basically conventional circuits 9, 10, and 11 are shown, each including a hybrid circuit H, amplifiers A, and an echo suppressor K, L, and N, respectively. In accordance with the invention, each of the circuits 9, 10, and 11 includes a marker device $M_9$, $M_{10}$, and $M_{11}$, respectively. When the switching system operates to tandem-connect circuits 8 and 9, for example, marker device $M_9$ responds to the connection by generating a characteristic operating or identifying signal which is detected by the timing circuit $T_9$ of circuit 8. The timing circuit $T_9$ then operates to introduce a preselected release time into the operation of echo suppressor J, and, in accordance with the invention, this release time is uniquely related to the total length and net loss of the tandem connection comprising circuits 9 and 10. As explained in connection with the description of circuit 8, the disabling device DD responds to the switching system connection between circuits 8 and 9 and transmits a signal through the switching system which is employed to disable echo suppressor K.

In the case of a tandem connection between circuits 8 and 10, the disabling device DD responds with an output signal which, in turn, disables echo suppressor L. Also, in response to the switching connection, the marker device $M_{10}$ generates an output signal which renders timing circuit $T_{10}$ operative, thereby introducing a release time into the operation of echo suppressor J which is suitably related to the total circuit length and net loss of the tandem connection comprising circuits 8 and 10. A similar series of operating steps would, of course, result from the tandem connection of circuits 8 and 11.

Thus, in accordance with the invention, the release time of an echo suppressor in a particular circuit is automatically set to a preselected duration which corresponds to the total circuit length and net loss of that circuit and any one of a plurality of circuits with which it is tandem-connected. Additionally, in accordance with the invention, any echo suppressor included in any one of the plurality of circuits is automatically disconnected when a tandem connection with the first circuit is made.

Figure 2:
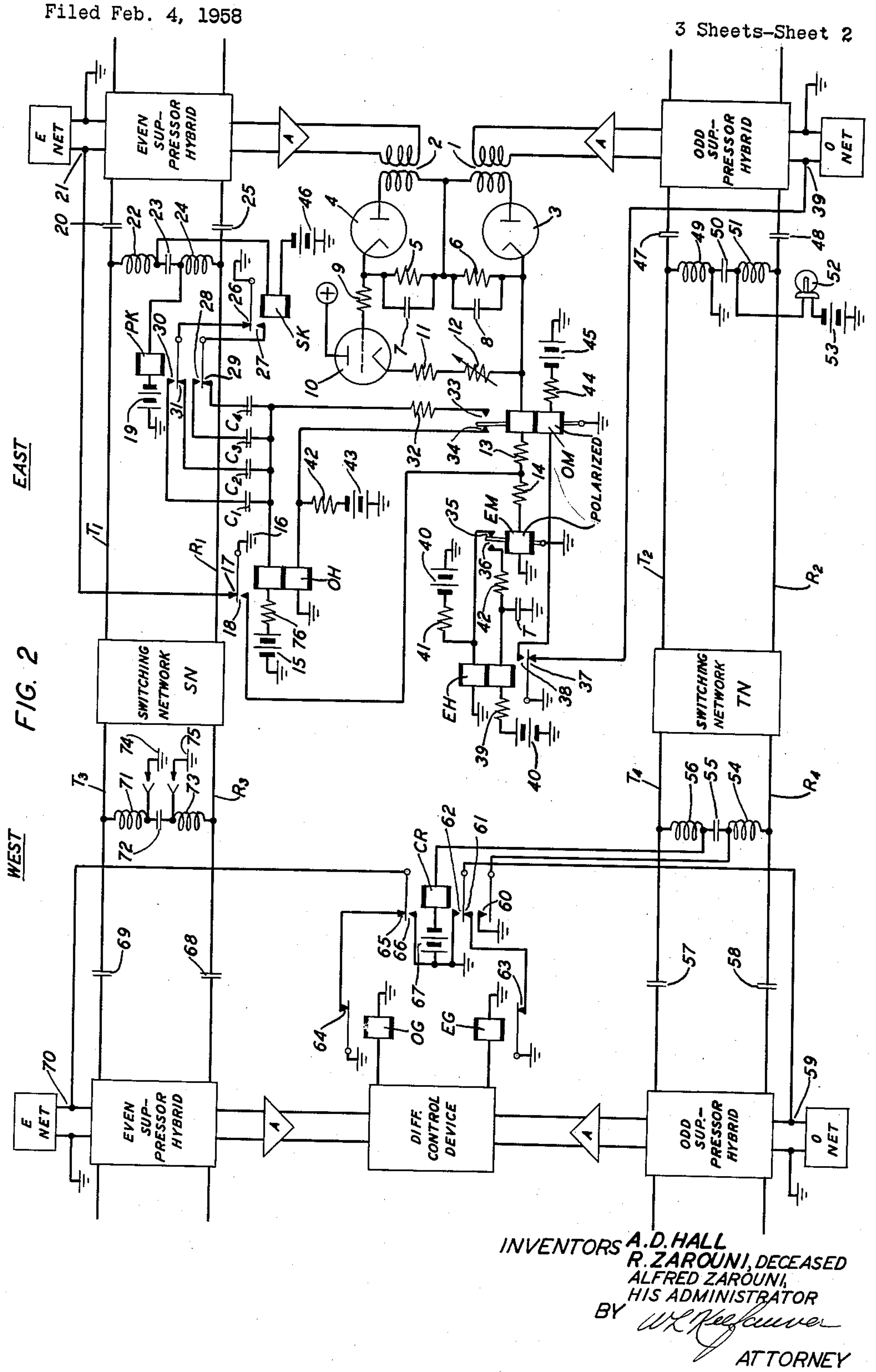
FIG. 2 shows one specific illustrative embodiment of the invention, namely, two tandem connected communication circuits each including an echo suppressor.

Proceeding now to a detailed discussion of the implementation of the features of the invention, the four-wire system shown in FIG. 2 comprises a first pair of toll lines T3—R3 and T1—R1 connected in tandem by a switching network SN and a second pair of toll lines T4—R4 and T2—R2 connected by a switching network TN. SN and TN may, of course, merely comprise parts of a common switching facility.

The East and West ends of these lines may be terminated by means of hybrid junctions in respective two-wire circuits leading to individual East and West subscribers, respectively. Such terminations and connections are well known, and therefore not illustrated. The resulting four-wire system, however, provides a first two-wire path T3—R3–T1—R1 for West to East transmission and a second two-wire path T2—R2–T4—R4 for transmission in the opposite direction.

Echo suppressors are provided to introduce loss into the return or echo paths established by the unillustrated terminations. The echo suppressor for the West subscriber comprises Even and Odd suppressor hybrids, each with respective balancing networks, E network and O network. When these networks balance their associated hybrids, a substantial loss, for example, 40 decibels, is introduced into the talking path. When these networks are short-circuited, their respective hybrids are also short-circuited, substantially reducing talking path loss, for example, to 2 decibels. The latter is the "normal" condition, i.e., with little loss in either talking path.

The differential control device and associated relays sense which path is carrying talking current, or, if both are, which is carrying the greater current and removes the short circuit from the balancing network of the hybrid in the opposite path. For example, if the West subscriber is talking and the East subscriber is not, the E network will remain short-circuited and the short circuit on the O network will be removed, resulting in a 2 decibel or very small loss in the West to East talking path and a 40 decibel, a substantial loss, in the echo or return path, i.e., the East-West talking path.

A similar echo suppressor is provided for the end of the four-wire system terminating in the unillustrated East subscriber, although more details for the latter suppressors are shown. The echo suppressor action thus far described is conventional. The conventional details of the East echo suppressor shown which have their counterparts in the schematically illustrated West echo suppressor include the pair of diodes 3 and 4 with their input transformers 1 and 2 and the amplifying triode 10. Relays EH and OH in the East circuit perform functions similar to relays OG and EG, respectively, in the West circuit, i.e., inserting or removing short-circuiting paths in response to the output of the associated differential control device.

In accordance with principles of the invention, an adjustable hang-over time is provided by four selectable capacitors C1, C2, C3, and C4 which, together with resistor 76, provide an adjustable time constant for the East subscriber echo suppressor. The selection of a particular capacitor is determined by the wiring of the grounding straps 74 and 75 which may be connected to provide a direct-current ground for either or both tip and ring leads T3—R3. The determination of the proper strap or straps to be grounded is made from a knowledge of the transmission characteristics of the particular two-wire path with which they are associated. Therefore, one line T3—R3 may have only strap 74 connected which will result in a selection of capacitor C4, whereas another line, which might, for example, be quite a bit longer than T3—R3 may have both straps 74 and 75 connected to select capacitor C3. The hold-over time is thus adjusted to suit the needs of the particular tandem connection established by the switching network at the time the switching is accomplished.

Also in accordance with principles of the invention, excess echo suppressors are automatically disabled whenever two or more circuits are switched together so as to include excess suppressors in the built up connection. In the embodiment shown in FIG. 2, this feature becomes operative upon switching the two networks together. A circuit is completed from battery 67 through switching network TN to the ground at the lower terminal of inductor 49 so as to operate relay CR. The operation of relay CR establishes short-circuiting paths to keep the suppressor hybrids in a low loss operating condition thereby, in effect, rendering the West echo suppressor inoperative.

The exact manner in which the above outlined functions are performed will now be described. The sequence of operations involving features of the invention is initiated when the two circuits shown are switched together. Ground current flows from the lower terminal of inductor 49 in the East circuit, through inductor 49, through the crosspoints (not shown) of switching network TN, through inductor 56 of the composite circuit comprising inductors 56 and 54 and capacitor 55, thence to the windings of relay CR, and through battery 67 to ground. Direct current from battery 67 is blocked from the West Odd suppressor hybrid by capacitor 57. The resulting operation of relay CR establishes a short-circuiting path from terminal point 70 through make contact 66 to ground. Another short-circuiting path is established from ground through make contact 62, and thence to junction point 59. As a result, both suppressor hybrids on the West circuit will be maintained at a minimum loss condition. So long as the short-circuiting paths described are maintained, it can be seen that the operation of relays OG and EG, which are controlled by the differential control device of the West echo suppressor, will have no effect on the established low loss operating condition of the suppressor hybrids.

The operation of relay CR also closes make contacts 60 thereby establishing a direct current path from ground to battery 53, through indicating lamp 52, through inductor 51, through the crosspoints (not shown) of switching network TN, through inductor 54 through make contacts 60, and thence to ground. Direct current from battery 53 is blocked from the Odd suppressor hybrid by capacitor 48. The function of lamp 52 is to serve as a positive indicator that relay CR has operated and that the echo suppressor on the West link has thereby been disabled. It will be understood that this function might be served equally well in a given installation with a buzzer, a relay, a recording panel, or with any other indicating device.

An additional action taking place upon the switching together of the two networks involves the composite network of the West link which includes inductors 71 and 73 and capacitor 72. It will be noted that the lower terminal of inductor 71 and the upper terminal of inductor 73 are shown with optional connections to ground 74 and ground 75 respectively. This arrangement serves as a means of marking or identifying the particular West link which has been tandem connected to the East link. The optional ground connections serve to indicate that a variety of marks can be made in order to identify any one of a number of circuits which might be connected to the East link. For example, the distinguishing marks available include a ground connection to 74 only, a ground connection to 75 only, no ground connection, or a ground connection to both 74 and 75.

For the purposes of illustrating the action of the particular circuit shown, it will be assumed that the lower terminal of inductor 71 is connected to ground 74 and that the upper terminal of inductor 73 is connected to ground 75. As a result, when the networks are switched together, ground current will flow through inductor 71 through the crosspoints of the switching network SN, through inductor 22, to the winding of relay SK, to its battery 46, and thence to ground. Direct current from battery 46 is blocked from the Even suppressor hybrids by capacitors 20 and 69. At the same time, a similar path from ground 75 established through inductor 73, through the crosspoints (not shown) of switching network SN, through inductor 24, through the coil of relay PK to its battery 19 and thence to ground. The operation of relays SK and PK establishes a path from ground through make contact 27 of relay SK through make contact 28 of relay PK, through capacitor C3, through the primary winding of relay OH, through resistor 76 and battery 15 to ground.

The selection of capacitor C3 when coupled with resistor 76 establishes a timing circuit with discharge characteristics appropriately matched to the precise hangover or delay time required in order to match the elapsed echo transmission time in the West link T3—R3. The values of capacitors C1, C2, and C4 are suitably selected to provide the proper timing characteristics to establish the hangover time required for each of three additional West circuits which could be tandem connected to the East circuit shown. A West circuit other than the one shown would, for example, have a ground connection from inductor 74 to the lower terminal of inductor 71, but no ground connection to the upper terminal of inductor 73. Such a marking arrangement would obviously result in the operation of relay SK while relay PK would remain unoperated. In that event, a timing circuit involving condenser C4 would be used. While only four possible timing circuits are illustrated, it is obvious that many additional selections could be made available by the appropriate arrangement of a variety of circuit markers or identifying means. For example, the number of possible selections could be doubled by having marks established from ground through resistors prior to passing through either inductor 71 or inductor 73. Marginal relays in series with relay PK and relay SK, together with appropriate make and break contacts and additional capacitors would complete the arrangement which would provide an appropriate hangover or release time for any one of eight West circuits.

The identification and detection scheme may be adapted to use alternating current as well as direct current. An alternating-current system would, for example, be more advantageous in an arrangement where pad switching already makes use of the tips and rings through the switching networks.

A fuller understanding of the action of the timing circuit in its control of hangover time will best be gained by following the complete cycle of operations of the echo suppressor shown in the East circuit. First it will be assumed that an outgoing voice signal from East to West has been impressed across the Odd suppressor hybrid of the East circuit. This signal is impressed across the input windings of a conventional repeating coil (not shown) which is connected in the circuit to form a balanced hybrid coil. The winding of this coil is normally short-circuited, producing an unbalance which causes the signal current to divide, one portion being applied to the toll wire line T2—R2 and the second portion being fed as an input to amplifier A, the output of which is impressed across the primary winding of transformer 1. It will be understood that transformers 1 and 2, diodes 3 and 4, and amplifier tube 10 are all a part of the differential control device of the echo suppressor of the East circuit. The comparable differential control device of the echo suppressor of the West circuit is shown schematically as a single unit. The stepped up signal voltage induced in the secondary of transformer 1 is applied across diode 3. The rectified direct-current components of the signal current then flow through resistance 6, developing a voltage with a positive polarity on the side of resistance 6 which is connected directly to the cathode of diode 3. Capacitor 8 is a by-pass capacitor.

The operation of the Even side of the circuit is essentially the same as described for the Odd side except for the apparatus designations. The rectified direct-current voltage is poled to make its potential positive on the diode 4 end of resistance 5. Condenser 7, in providing a low impedance path to remove alternating-current components from the load impedance, serves the same purpose as condenser 8. Resistors 5 and 6 are connected in series and arranged so that the rectified voltages from the West to East and East to West signals will oppose each other. The algebraic difference between these two voltages is then applied betweeen the grid and the cathode of vacuum tube 10.

Vacuum tube 10 is connected into the circuit as a direct-current amplifier, cathode current flowing through resistor 11 and resistor 12 to the primary winding of relay OM, through resistors 13 and 14 and the windings of relay EM, and thence to ground. Resistor 12 is adjustable to enable the selection of an appropriate value of resistance so that equal positive and negative voltages will be required to operate relay EM and release relay OM. The normal cathode current flowing in this circuit will hold relay OM operated closing make contact 34 of relay OM and at the same time releasing relay EM which in turn closes break contact 35.

As the signal amplitudes increase on the Odd side, the direct-current voltage developed across resistor 6 will increase. This voltage has been poled, however, to make the grid of tube 10 more negative. The cathode current will therefore decrease to release relay OM. When make contact 34 of relay OM opens and break contact 33 closes, current will flow from ground through the secondary winding of relay OH and resistance 76 to battery 15 and back to ground. This current surge will cause fast and positive operation of relay OH. Closure of break contact 33 of relay OM will discharge hangover condenser C3. This condenser discharge will cause a transient of holding current to flow from the positive plate battery through resistor 76, through the windings of the OH relay, through resistor 32, through break contact 33 of relay OM, and thence to ground. The opening of break contact 17 of relay OH will remove the ground 16 from terminal 21 of the E repeating coil in the E network and will introduce a high value of loss into the Even transmission circuit so that echoes returning from the far end of the West circuit will be suppressed. The closure of make contact 18 of relay OH will shunt resistor 14 across the windings of relay EM which will in turn prevent the Even relay chain from operating. When the signal currents are removed from the Odd transmission path, relay OM will operate immediately but relay OH will remain operated for a sufficient time to suppress any echoes returning from the distant West terminal before enabling the Even path. Hangover current will flow from battery 15 through resistor 76, through the primary winding of relay OH and, assuming both relays PK and SK have been operated by the marking signal from the West circuit, then through capacitor C3, make contact 28 of relay PK, make contact 27 of relay SK, and thence to ground. The capacitance of capacitor C3 is designed to provide a hangover period which will be sufficient to hold relay OH operated for the time required to transmit the last voice currents to the distant terminal and back. The release of make contact 18 of relay OH and the closure of break contact 17 of relay OH will remove the disabling feature from relay EM. The final closure of break contact 33 of relay OM will restore the short circuit across a repeating coil winding (not shown) in network E and will permit transmission through this path to the East subscriber.

When a signal is transmitted through the Even branch only, diode 4 will rectify the signal current and build up a direct-current potential across resistor 5. This potential is poled to make the grid of tube 10 more positive which in turn will increase the cathode current. Increasing the amplitude of the signal will raise the cathode current further and will finally operate relay EM. Opening break contact 35 of relay EM will remove a short circuit normally across the secondary winding of relay EH and will allow the kick current from capacitor T to energize the winding to cause positive operation of this relay. The holding and hangover arrangements are exactly the same as described for the OH relay. The opening of break contact 37 of relay EH will remove the short circuit normally across the repeating coil of the O network establishing a high degree of balance across the hybrid coil, thereby suppressing the echoes from the West direction. The closure of make contact 38 of relay EH will connect ground to the secondary winding of relay OM so that current will flow from ground through make contact 38 of relay EH, through the secondary winding of relay OM, through resistor 44, through signal battery 45, and thence to ground. The holding current will disable relay OM effectively by preventing it from ever releasing.

When the voice input is removed from the Even path, relay EM will release immediately, but relay EH will remain operated for a period long enough to suppress any echoes returning from the distant terminal before enabling the Odd to to Even path. The proper value of hangover current will flow from the battery 40 through resistor 39, through the primary winding of relay EH, through capacitor T, and back to ground. Inasmuch as transmission time in the East network is known and fixed, it is of course necessary to provide only a single hangover capacitor, T, in order to provide the proper hangover time. The sufficiency of a single capacitor for this purpose is in contrast to the use of four capacitors, C1 through C4, which provide the proper hangover time for any one of the four classes of circuits which might be connected in tandem to the East circuit.

The opening of make contact 38 of relay EH removes the disabling current from the secondary winding of relay OM. The final closure of break contact 37 of relay EH will restore the short circuit across the Odd suppressor hybrid, thereby permitting transmission to the West subscriber.

It will be noted that the features of this invention, while providing the advantages described hereinabove, in no way limit the conventional functions of echo suppressor operation. For example, differential action which permits one subscriber to break in while the other is talking is provided for. Assuming that the East subscriber is talking and that the rectified voltage developed across resistor 6 will hold relay OM released and relay OH operated to suppress transmission to the West subscriber, the West subscriber, when he starts talking, can operate the Even suppressor even though his transmission circuit to the East talker is blocked. His voice current will be rectified and will build up a voltage across resistor 5 which will oppose the voltage across resistor 6. When the voltage across resistor 5 exceeds, by a small amount, the voltage already across resistor 6, relay OM will operate. After the hangover period of relay OH has elapsed, this relay will return to its normal position and will enable the West to East subscriber path. The West subscriber can talk and hold the circuit to the East talker as long as his signal is maintained stronger.

It is to be understood that the above-described embodiments of the invention are only illustrative of the principles of this invention. Numerous other arrangements may be devised by those skilled in the art without departing from the spirit, scope, and teaching of the invention.

What is claimed is:

1. In a communication system, a first plurality of bilateral transmission circuits each including an echo suppressor, a second plurality of bilateral transmission circuits each including an echo suppressor, means for connecting any one of said first transmission circuits in tandem with any one of said second transmission circuits, means responsive to said connecting means for disabling the echo suppressor included in any given circuit of said first plurality of circuits, and means responsive to said connecting means for adjusting the release time of the echo suppressor in any of said second plurality of circuits to a duration having a preselected relationship to the net loss and total circuit length of the circuits joined in tandem by said connecting means.

2. In a built up telephone circuit a plurality of links each including an echo suppressor, an additional link including an echo suppressor, means for tandem connecting any of said plurality of links to said additional link, means responsive to said connecting means for disabling the echo suppressor of any given one of said plurality of links upon tandem connection to said additional link, marker means for identifying any one of said plurality of links to said additional link when tandem connected therewith, a plurality of timing circuits for controlling the release time of the echo suppressor in said additional link, and means for selecting a particular one of said timing circuits, each of said timing circuits having a time constant with a preselected relationship to the net loss and total circuit length of a respective one of the possible tandem connections, said selecting means being responsive to said marker means.

3. A built up telephone circuit in accordance with claim 2 wherein said timing circuits comprise a plurality of capacitance-resistance combinations.

4. In a communication system a plurality of bilateral transmission links, at least one of said links including an echo suppressor, means for tandem connecting at least two of said links, means for disabling at least one echo suppressor whenever a tandem connection is made involving at least two echo suppressors, marker means associated with at least one of said links for sending identifying signals to at least one other link when connected in tandem therewith, a plurality of capacitance-resistance timing circuits associated with at least one of said echo suppressors for controlling the release time of said echo suppressor in accordance with the total circuit length and net loss of said tandem connection, the operation of said timing circuits being responsive to the operation of said marker signals.

5. In combination, a first transmission circuit including an echo suppressor, a plurality of transmission circuits, means for connecting said first circuit in tandem with any one of said plurality of circuits, means responsive to the operation of said connecting means for selectively generating any one of a plurality of signals identifying a respective one of said plurality of circuits and means jointly responsive to said operation and to said identifying signal for selectively introducing any one of a plurality of preselected release times for said echo suppressor, each of said release times having a preselected relation to the total circuit length and net loss of a tandem combination comprising said first circuit and a respective one of said plurality of circuits.

6. Apparatus in accordance with claim 5 wherein at least one of said plurality of circuits includes an echo suppressor, means responsive to the operation of said connecting means for generating a control signal, means jointly responsive to said control signal and to said operation for disabling the echo suppressor in that one of said plurality of transmission circuits which is tandem-connected to said first circuit by said operation.

References Cited in the file of this patent

UNITED STATES PATENTS

| | | |
|---|---|---|
| 1,545,558 | Hamilton | July 14, 1925 |
| 1,734,121 | Fisher | Nov. 5, 1929 |
| 1,943,104 | Bjornson | Jan. 9, 1934 |
| 2,018,494 | Hearn | Oct. 22, 1935 |